June 23, 1970  G. SYKE  3,516,749
REMOTE MEASURING DEVICES
Filed Dec. 30, 1966  7 Sheets-Sheet 2

INVENTOR
GEORGE SYKE
BY Bacon & Thomas
ATTORNEYS

June 23, 1970 G. SYKE 3,516,749
REMOTE MEASURING DEVICES
Filed Dec. 30, 1966 7 Sheets-Sheet 3

INVENTOR
GEORGE SYKE
BY
Bacon & Thomas
ATTORNEYS

June 23, 1970 G. SYKE 3,516,749
REMOTE MEASURING DEVICES
Filed Dec. 30, 1966 7 Sheets-Sheet 5

INVENTOR
GEORGE SYKE
BY Bacon & Thomas
ATTORNEYS

June 23, 1970   G. SYKE   3,516,749
REMOTE MEASURING DEVICES
Filed Dec. 30, 1966   7 Sheets-Sheet 7

INVENTOR
GEORGE SYKE
BY Bacon & Thomas
ATTORNEYS

United States Patent Office

3,516,749
Patented June 23, 1970

3,516,749
REMOTE MEASURING DEVICES
George Syke, Esher, England, assignor to The British Iron and Steel Research Association
Filed Dec. 30, 1966, Ser. No. 606,358
Int. Cl. G01b *11/02*
U.S. Cl. 356—171                                   12 Claims

ABSTRACT OF THE DISCLOSURE

This invention is concerned with a system for determining the dimensions of a fault free rectangle which can be cut from a plate positioned on a shear approach table. The system essentially comprises a lens system for providing an image of the plate, a cursor or mask device having respectively relatively movable cursor lines defining a rectangle or a rectangular aperture of variable size, the cursor or mask device being positioned in the plane of the image so as to be superimposed thereon, means for viewing or scanning the image and cursor or mask device, and means for determining the dimensions of a fault free rectangle in the plate.

---

According to one aspect of the invention, there is provided a remote viewing system for determining a a fault free rectangle which can be cut from a plate when positioned on a shear approach table, comprising a lens system for providing an image of the plate, a device including relatively movable lines defining a rectangle and positioned substantially in the plane of said image so as to be superimposed thereon, and means for inspecting the image and superimposed device, and means for moving the plate relative to the lines nad for moving at least some of the lines whereby to determine the dimensions of a fault free rectangle in the plate.

Figure 1:
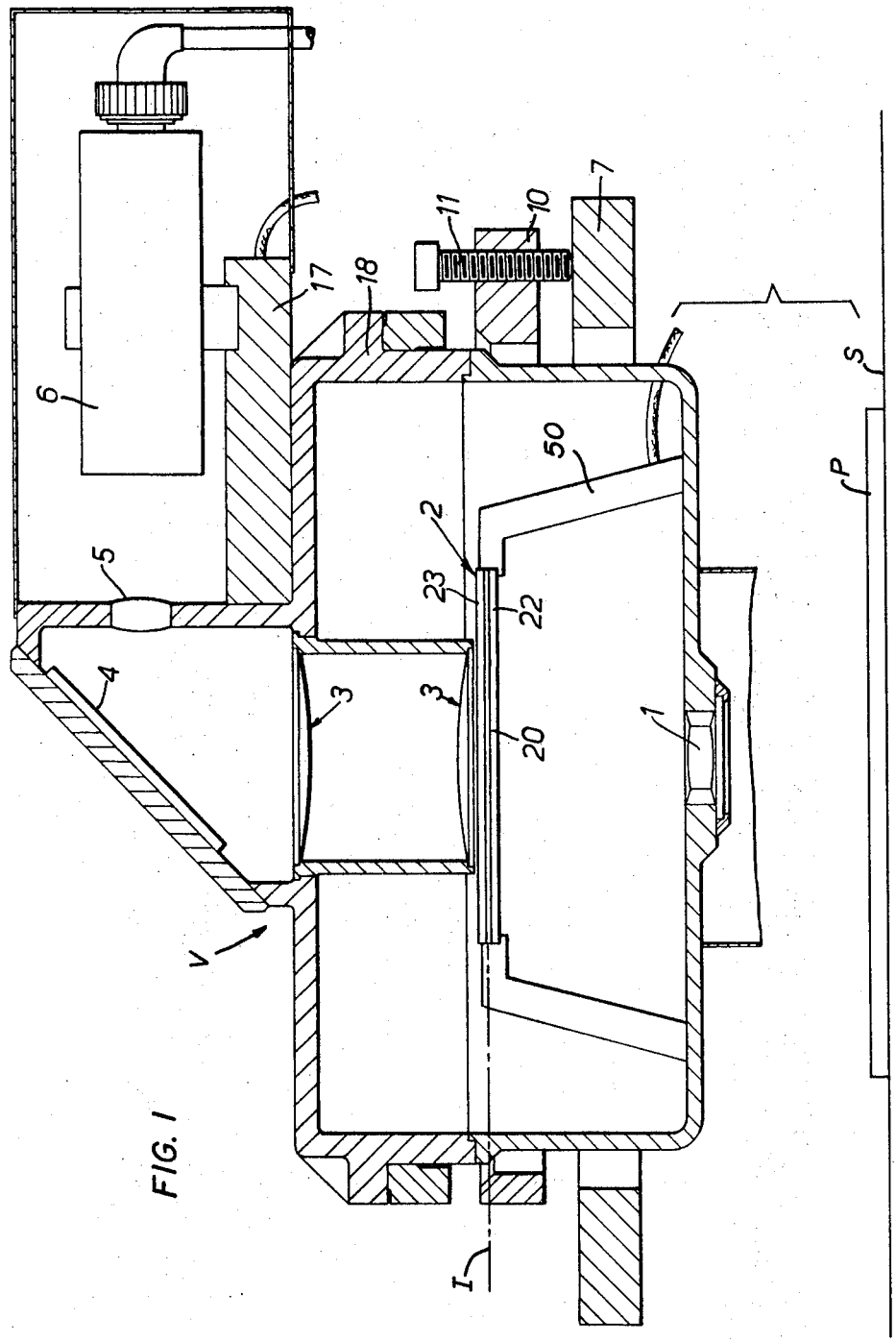
Figure 2:
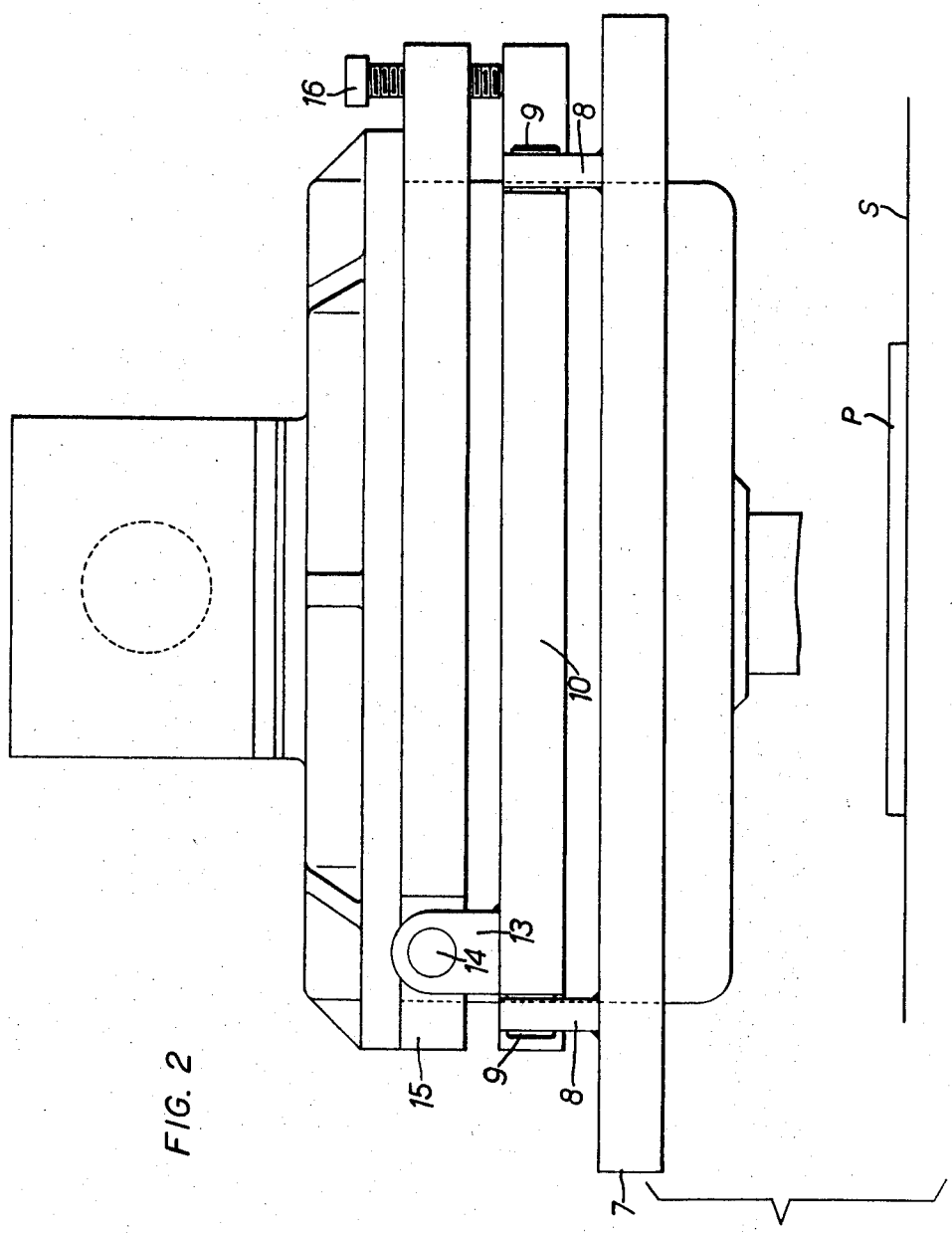
Figure 3:
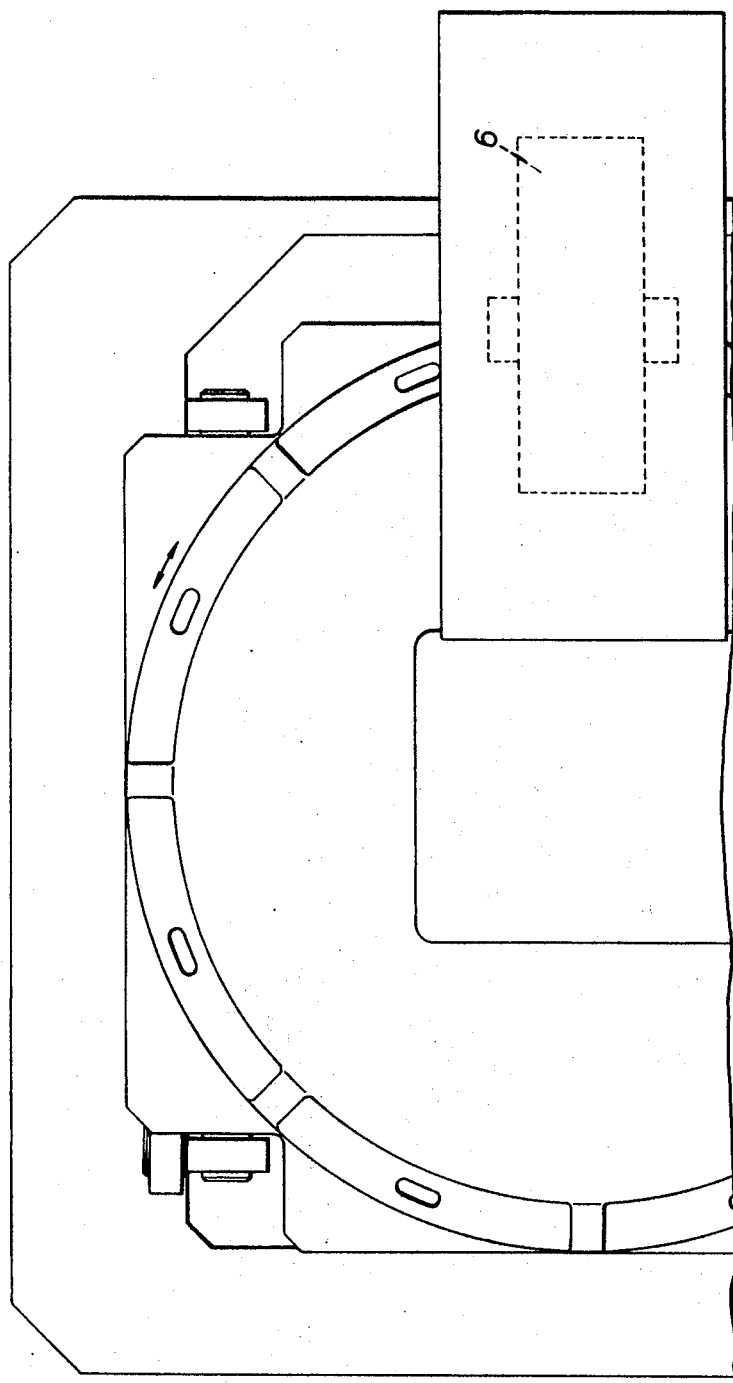
Figure 4:
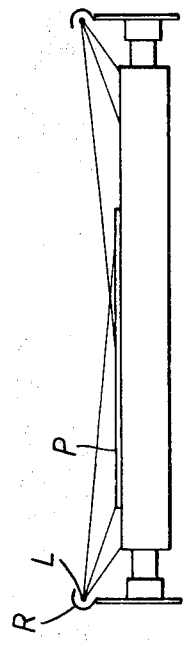
Figure 5:
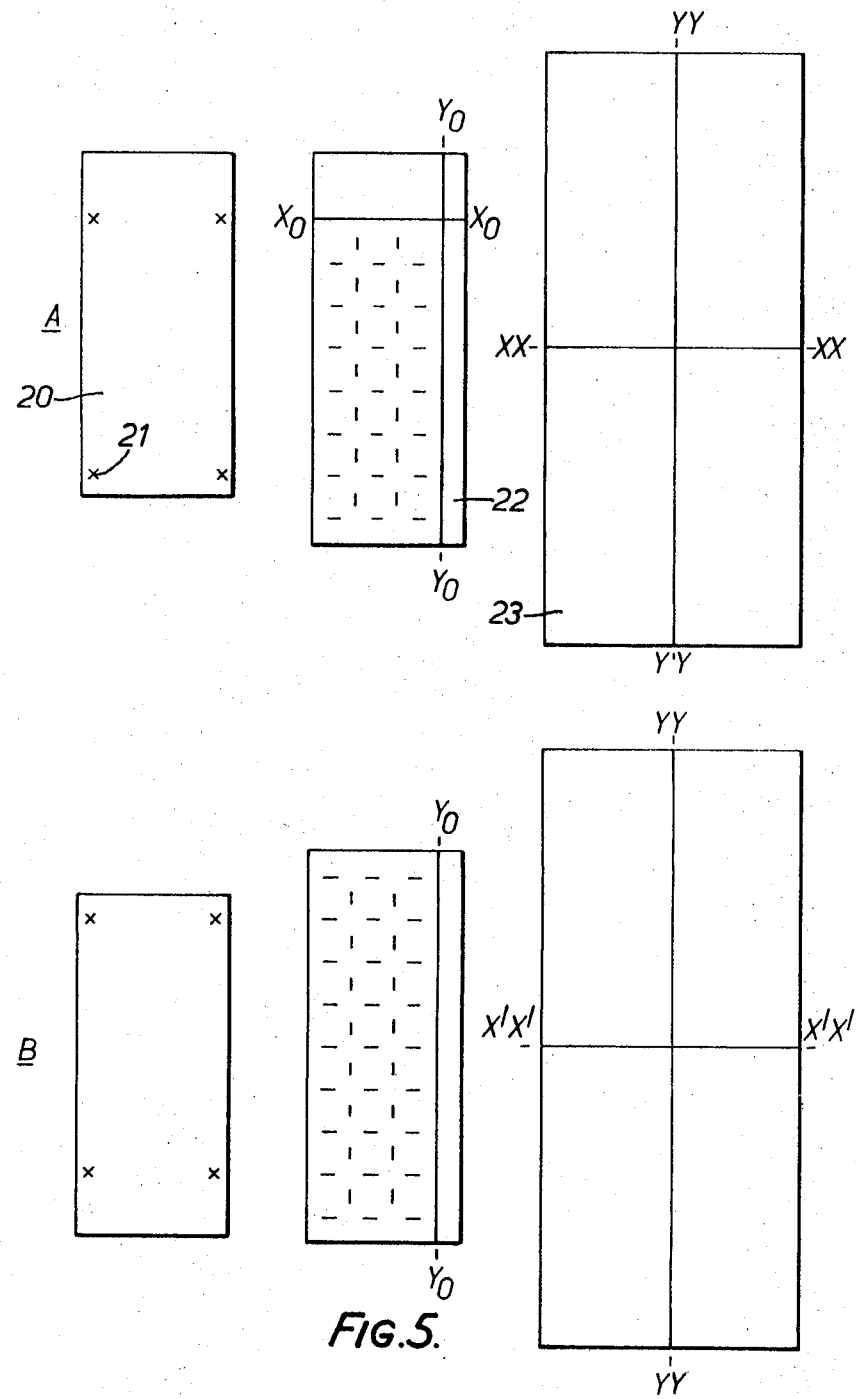
Figure 6:
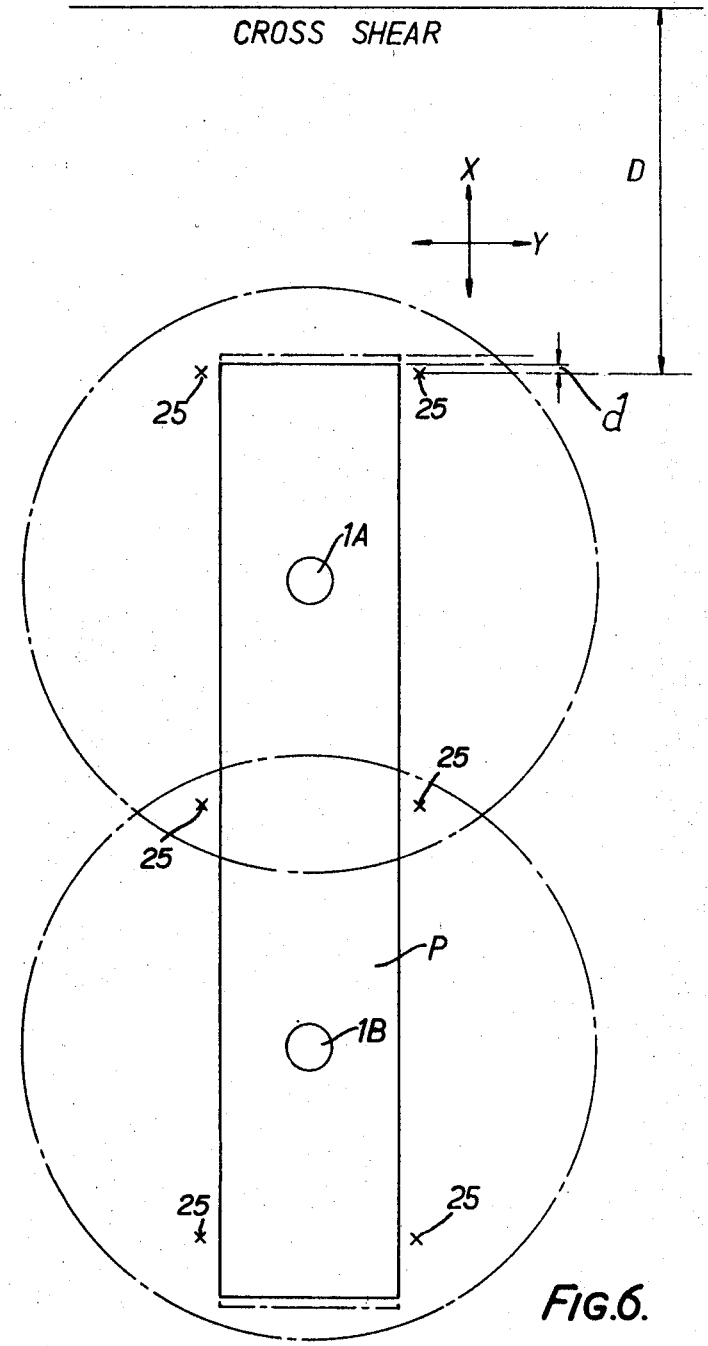
Figure 7:
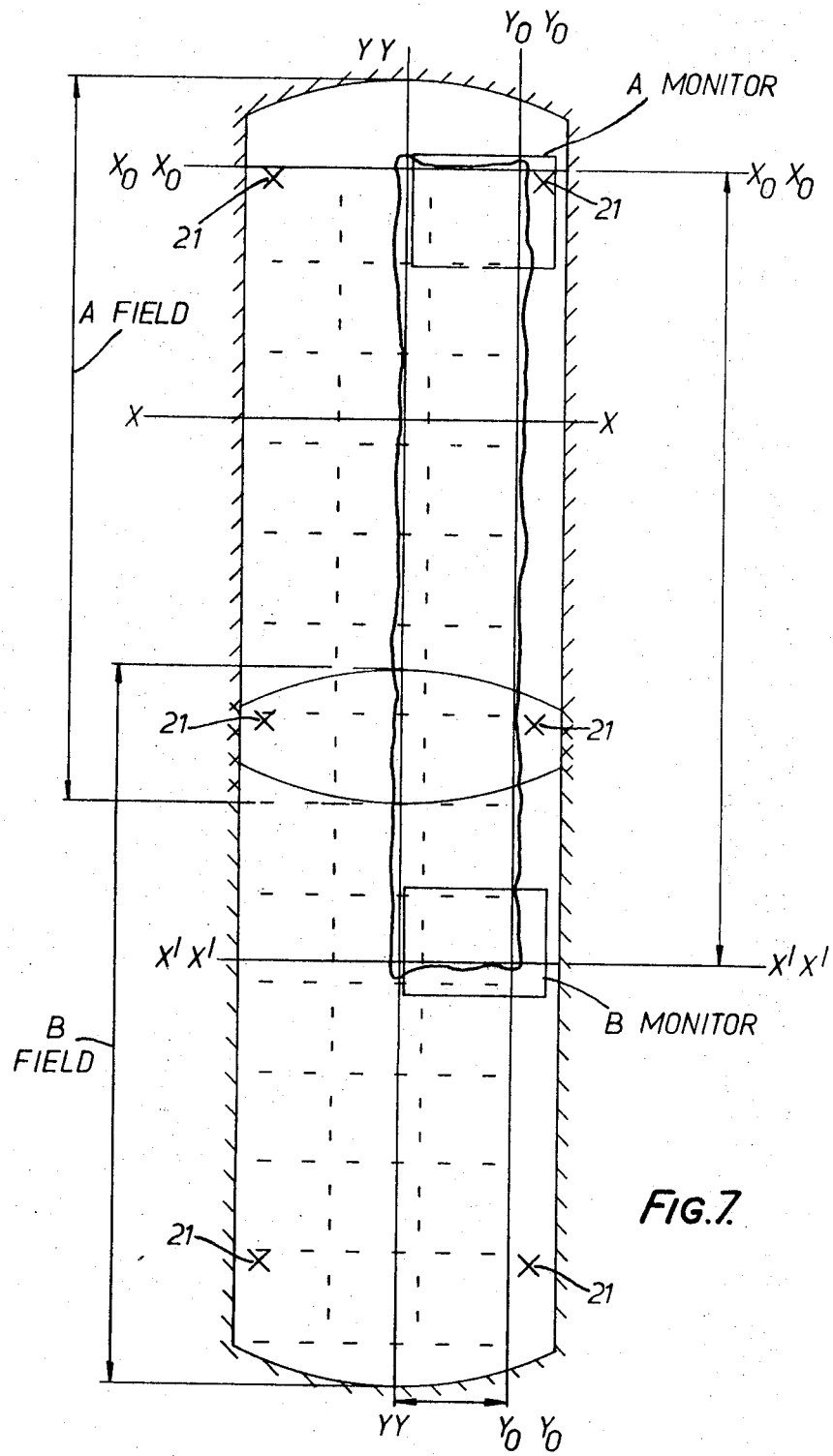
Figure 8:
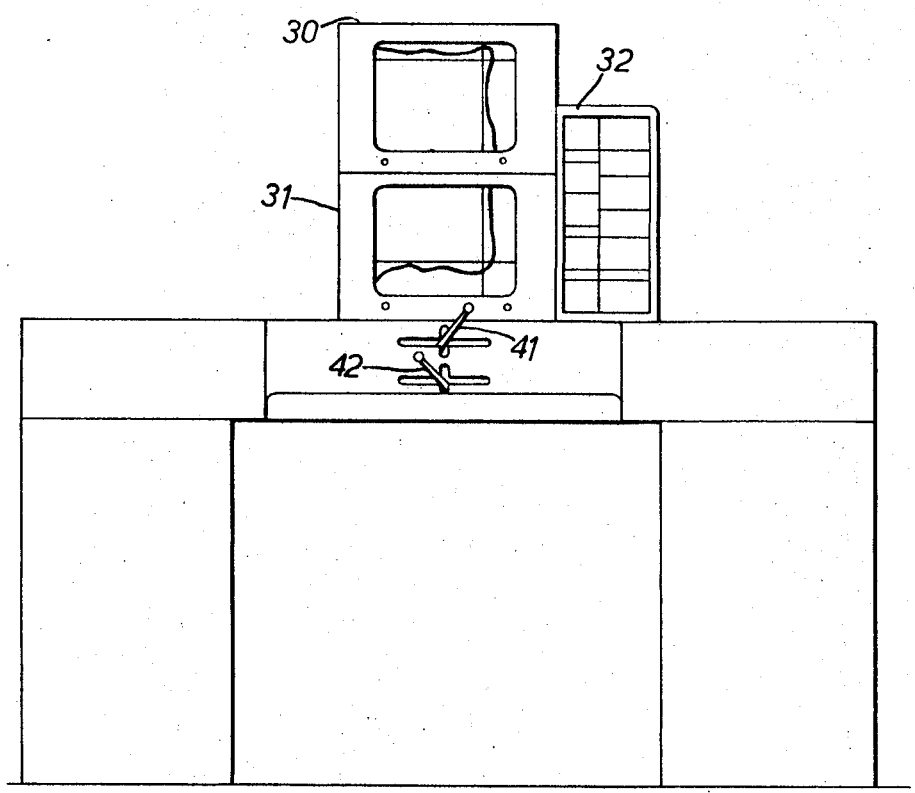
Figure 9:
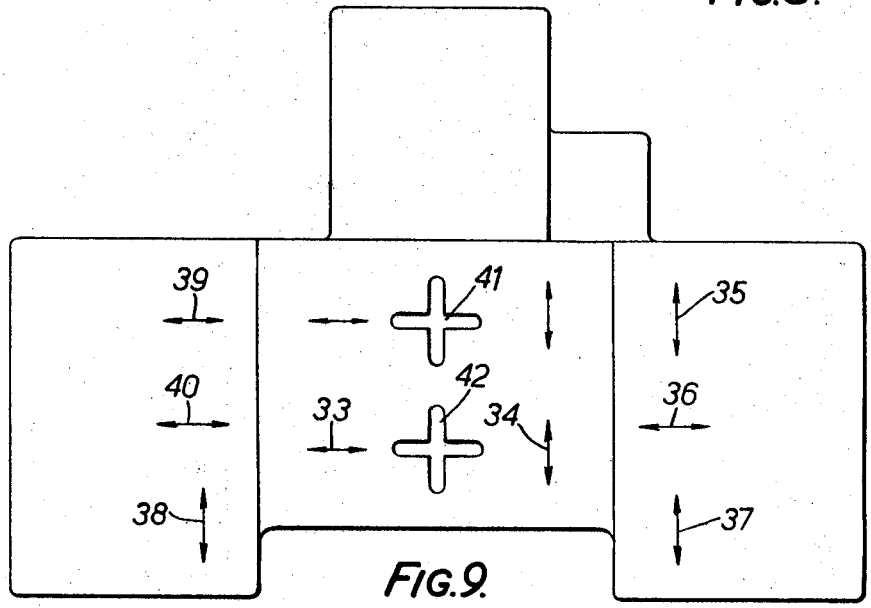

Features and advantages of the present invention will appear from the following description of one embodiment, given by way of example only, reference being had to the accompanying drawings in which:

FIG. 1 is a schematic elevation of a system for use in association with an approach table for cross and side shears, FIG. 2 is an elevation of the mounting for the optical elements viewed from the left of FIG. 1, FIG. 3 is a plan view of the system of FIG. 1, FIG. 4 is an end elevation of the table showing side illumination devices, FIG. 5 is a plan view of the individual cursor elements, FIG. 6 is a schematic plan view of the viewing and datum devices, FIG. 7 is a plan view of the cursor elements relative to a plate to be cut, FIG. 8 is an elevation of the operator's control unit, and FIG. 9 is a plan view of the operator's controls.

For applying the system to a shear approach table, whereby an operator in a remote position may view a plate set up the required dimensions, and check the plate against the dimensions a suitable construction is shown in the drawings.

Referring to FIGS. 1 and 2 above the shear approach table S, on which rests a plate P to be viewed, is located above a viewing unit comprising an image forming lens 1, a cursor assembly 2, a field lens system 3, a mirror 4, a lens 5 and a television camera 6. This unit is suspended from any suitable structure through a ring 7. This ring has lugs 8 in which bear pins 9 on an annular support 10. Angular adjustment about the axis of pins 9 is effected by a screw 11 which is preferably power driven. Support 10 has lugs 13 engaged by pins 14 on bearer 15 movable about the axis of pins 14 by an adjuster screw 16 which again is preferably power driven. The camera housing 17 and lens housing 18, rigid with one another, rest on bearer 15 and are rotatable thereon.

The cursor assembly 2 includes a plurality (in this case three) of transparent plates 20, 22, and 23 (FIGS. 1 and 5) of which lower plate 20 is for adjustment purposes and carries on its upper face four X marks 21. Intermediate plate 22 carries on its upper face two lines $X_o$—$X_o$ and $Y_o$—$Y_o$ together with length and width dimension indications as shown. Upper late 23 carries on its underface lines X—X and Y—Y.

The X marks of plate 20 are displaced from the aerial image plane I by the thickness of plate 22 and thus apear slightly out of focus on the camera tube face.

An alternative arrangement is obtained by making plate 22 a little narrower and replacing plate 20 by two narrow edge-strips, one on either side of plate 22.

This puts all cursor makings accurately in the aerial image plane.

The viewing assembly V is suitably beside a cat walk (not shown) at about 45 ft. above the table. Since the area of the table is of the order of 65 ft. x 12.5 ft. two viewing assemblies A and B (FIG. 7) are used to avoid prohibitively wide angles of view. FIG. 6 shows the image forming lenses of assemblies A and B, identified at 1A and 1B and six datum lamps 25 masked to provide at the shear approach table X slits brightly illuminated from below. It will be seen that there is in fact an overlap of the areas viewed.

The cameras are preferably Vidicon tubes and each optical system forms an image of a 40 ft. diameter circle in the plane of the table. The camera field of view should be restricted to obtain adequate resolution and the camera field size is preferably 8 ft. x 6 ft. with facilities for scanning the whole area of 35 ft. x 15 ft.

The system will now be reviewed in detail.

VIEWING UNIT

Lens 1 forms an aerial image of the plate P resting on the shear approach tables. By way of example, a reduction of 1:75 has been assumed. The primary aerial image of a 40 ft .diameter circle at the shear approach table is thus 6.4 inches.

The cursor plates 29, 22 and 23 are located in the region of the aerial image plane and the cursor lines are thus superimposed on the aerial image. Field lens 3 directs the light from lens 1 via 45° mirror 4 to lens 5, which forms a secondary image in the plane of the Vidicon tube face. In doing this a further reduction by a factor of 2.56 takes place and the diameter of the secondary aerial image becomes 2.50 inches. The total reduction is 1:192.

The usual frame size on the Vidicon tube face is .500" x .375" and this represents an area of 8 ft. x 6 ft. at the shear approach table.

The total area of interest at the shear approach table is about 38 ft. long x 16 ft. wide, corresponding to a secondary image area of 2.38" x 1". This is scanned by traversing the television camera (including the Vidicon tube) parallel to itself—vertically and horizontally. Lens 5 remains stationary. The travel of the camera is thus about 2" vertically and about .5" horizontally.

DATUM LAMPS 25

FIG. 6 shows six datum marker lamps 25, alongside the plate P on the shear approach table. Four of the lamps 25 lie close to the positions of the corners of a plate of maximum size, and two lie in the overlapping field of view of both aerial units.

The datum lamps take the form of two slits crossed in the form of a X. diffusely illuminated from below.

The slits should be about 1/20 inch wide and 3 inches long placed at 45° to the width and length of the plate, and so to the lines of the television raster.

The datum lamps serve to mark the points, where the lines of sight from the imaging lens 1 to the lamps intersect the plane of the top surface of the plate resting on the roller table. They can nevertheless be located below flush, within the confines of the shear approach table, if allowance is made on cursor plate 20 for parallax.

When the aerial viewing units (V) are correctly set up, i.e. all eight crosses in the cursor plates coincide with the aerial images of the corresponding marker lamps, the following conditions obtain:

(1) The cursor plates are parallel to the plane of the shear approach table, hence there is no trapezium distortion.

(2) The correct image magnification is obtained and the cursor calibrations represent true dimensions of plate P.

(3) The cursor lines are parallel and at right angles to the axis of the shear approach table and hence to the shears.

At the time of installation, the position and height of the aerial units V must be set accurately, with the datum point alignment controls at mid position, to meet these conditions.

ILLUMINATION OF PLATE P

The overall accuracy of the system depends on the brightness, contrast and sharpness of the edges of plate P in the aerial image. They should appear as white lines in a dark field.

Hot rolled plate P, as it appears at the shears is quite dark and has very low reflectivity. Its specular reflectivity is only a little higher than its off specular reflectivity.

Using the illumination technique shown in FIG. 4, in which the lamps are positioned outside the edge of the plate and in which the light rays impinge obliquely on the plate, there is some specular reflection from the edges to the aerial imaging unit and they appear a little brighter than the flat surface of the obliquely illuminated plate. To achieve an adequate edge brightness and contrast with a modest lighting power consumption, it is proposed to brighten the edges, by means of white paint, chalk or wire brush as the plate P approaches the viewing station.

The illumination required by the Vidicon camera to obtain a good bright image of white lines and white areas (chalk marks) is of the order of one or two hundred foot candles.

Flourescent tubular lamps L with reflectors R, consuming about 20 watts per foot length, should be adequate. The total lighting power over 65 ft. length on both sides of the roller table would thus amount to about 2.6 kw.

Alternatively, lamps L or an illuminated surface may be placed underneath the shear approach table, so that the plate P appears dark against a brighter background. The top face of the plate P then requires only sufficient illumination to show up the white chalk or paint defect marks.

MOUNTING OF THE VIEWING UNITS V

These should be accurately above the centre line of a correctly positioned 12 ft. 6 in. wide plate P as shown.

At the time of installation the angular position of the units V around their vertical axis is adjusted to make the cursor lines appear accurately parallel to the datum lined defined by the datum lamps. The units are locked in this position.

It is possible that a small, very slow shift or tilt of the supporting structure will take place, e.g. due to daily or seasonal temperature variations. Errors in positioning plate P due to this cause are eliminated by remote controlled positioning of the aerial units so that the image of the datum lamps 25 is kept accurately in coincidence with the datum points on the cursor plates 20, 22 and 23. Initially the operator would observe alignment and actuate the alignment controls by hand. If desired this could be done automatically by error detection with position sensing photocells (not shown).

With the units supported from the roof structure, movements are compensated by the screws 11 and 16 which control X and Y alignment respectively.

CURSORS ASSEMBLY 2 AND DRIVES

The plates of the cursor assembly are edge illuminated glass plates. Plate 20 with its four datum X's only is in a frame 50 rigidly attached to the aerial unit. Plate 22 and 23 are mounted on sliding carriages (not shown) with motions in the X or Y direction. They are actuated by Magslip or similar drive from the operator's pulpit and their exact position is remotely indicated in the pulpit, as follows:

1st carriage—has calibrated X motion relative to the frame and determines $d$ (see FIG. 6)
2nd carriage—has calibrated Y motion relative to the 1st carriage and determines plate width
3rd carriage—has calibrated X motion relative to the 2nd carriage and determines plate length.

Cursor plate 22 is attached to the 1st carriage plate 23 to the 3rd carriage.

Corresponding carriages of A and B units are driven from a common drive transmitter to synchronize the movements of the carriages and hence that of the plates. Correct relative position is verified by means of the two central datum lamps 25 near 30 ft. on the plate-length scale, which are included in the overlapping regions of fields A and B.

OPERATOR'S UNIT—FIGS. 8 AND 9

The operator has:

(a) Two television monitors 30, 31 one above the other, in the central field of view of the operator, and associated one with each of the two cameras 6.

(b) Indicators 32 for indicating the position of the cursor lines of the two assemblies 2, showing length, width and "front displacement $d$," dimensions in feet, inches and fractions preferably by digital display. This minimises the risk of reading errors and facilitates linking up with a computer or other data handling scheme.

(c) Datum-point alignment controls 33, 34 for A and B units in $x$ and $y$ directions used only occassionally to compensate for movements of the structure supporting the viewing assembly.

(d) Controls for controlling the position of the cursor lines of the assemblies 2.

(1) Controls 35, 36 for setting length and width, usually once per plate.

(2) Control 37 for setting front displacement $d$. This may be used repeatedly as a longitudinal trimmer during positioning or measurement of plate P.

(e) Controls for positioning the plate P.

(1) Forward and reverse drive 38 of shear approach table for approximate longitudinal positioning of the plate P.

(2) Transverse motion drive 39 for the front of plate P and transverse motion drive 40 for the tail of plate P, both drives being used repeatedly for accurate positioning of plate P.

(f) Joystick controls 41, 42, one for each camera 6, to enable the cameras to be scanned along and across the plate.

OPERATION

The procedure followed by the operator when a plate P arrives on the shear approach table S is envisaged as follows:

(1) Check on both monitor screens that datum lamps 25 coincide with datum markings 21. Adjust alignment controls 33, 34 if necessary. This may be made fully automatic by means of position sensing photocells.

(2) Set L and W controls to length and width of plate P specified in the order.

(3) Set camera controls 41, 42 so that $X_o$–$Y_o$ intersection is displayed at top right of A monitor and—if plate length is over 30 ft.—intersection X–$Y_o$ at bottom right of B monitor.

(4) Position the plate P on the shear approach table S so that plates edges and defect markings seen on the monitors 30, 31 are just outside the cursor lines of assemblies 2.

(5) Run the cameras 6 along all edges and make fine adjustments to transverse and longitudinal plate position controls 38, 39 and 40 and to "set $d$" control, so that all edges and defect markings are outside the $X_o$–$Y_o$–X–Y rectangle. When this is achieved, the plate P is in position; it should be advanced by D–$d$ to make the first cross cut.

(6) If it is not possible to find a sound rectangle of the specified size in the plate P, adjust plate position and cursor line positions so that all edges and defect markings are just outside the rectangle. Read the length and width of $X_o$–$Y_o$–X–Y area on the L and W indicators 32.

Alternatively, the apparatus may include a scanning device which will scan the image, preferably a mask being provided which defines an aperture of rectangular shape, an end and a side of which are fixed and an end and a side edge of which are movable. The scanning device may operate to position the plate relative to the fixed sides of the aperture and then operate to move the movable sides of the mask, the dimensions of the resultant fault free image being fed in terms of plate size to the computer which will determine the order to which that size most nearly corresponds. Thereafter, the plate P may be moved to the side and end shears by an amount to produce a plate according to that order.

The scanning device may be arranged to indicate the range of available rectangles between maximum and minimum length, and minimum and maximum width.

I claim:

1. A viewing system for determining a fault free rectangle which can be cut from a plate when positioned on a shear approach table, comprising a lens system for providing an image of the plate, a rectangle-defining means, including relatively movable lines defining a rectangle positioned substantially in the plane of said image so as to be superimposed thereon, means for inspecting the image and superimposed rectangle, and means for moving the image of the plate relative to the lines and for moving at least some of the lines whereby to determine the dimensions of a fault free rectangle in the plate.

2. A system according to claim 1, wherein said rectangle is a cursor, and wherein said moving means is operable by an operator.

3. A system according to claim 1, wherein said rectangle-defining means is a mask defining a rectangular aperture of variable size, and including means for scanning the image and superimposed mask, said scanning means actuating said moving means to position the image of the plate relative to the aperture and to vary the size of the aperture to determine the dimensions of a fault free rectangle in the plate.

4. A system according to claim 1, including a rectangular plate support table and means for adjusting the position of said lens system and said rectangle defining means above the plate support tables that the plane of said lines is set parallel to the plane of the table, and so that the lines are parallel and at right angles to the axis of the table.

5. A system according to claim 4, and including marking means carried by said table and said rectangle-defining means, which when aligned indicate that said lens system and said rectangle defining means are in their required positions relative to the table.

6. A system according to claim 5, including means for illuminating said marking means and wherein a photocell arrangement is operable to control said adjusting means to maintain the marking means on said table and said rectangle-defining means in alignment.

7. A system according to claim 2, wherein the cursor includes a plurality of transparent superimposed plates each carrying cursor lines calibrated in respect of length and width of the plate to be viewed.

8. A system according to claim 6, wherein said transparent plates are mounted for movement longitudinally and laterally of the table.

9. A system according to claim 6, including a further superimposed, transparent plate carrying said marking means.

10. A system according to claim 8, including means for illuminating the transparent plates through the edge thereof.

11. A system according to claim 1, including a plate support table and a plurality of units, each unit consisting of said lens system, rectangle-defining means, and inspecting means, disposed above the plate support table.

12. A system according to claim 11 wherein said rectangle-defining means is a cursor including a plurality of transparent, superimposed plates each carrying cursor lines calibrated in respect of length and width of the plate, said plates being movable longitudinally and laterally of the table, and wherein the plates of each unit are driven from a common drive transmitter to synchronize the movements of the plates.

No references cited.

RONALD L. WIBERT, Examiner

P. K. GODWIN, JR., Assistant Examiner

U.S. Cl. X.R.
356—170